Figure 1:
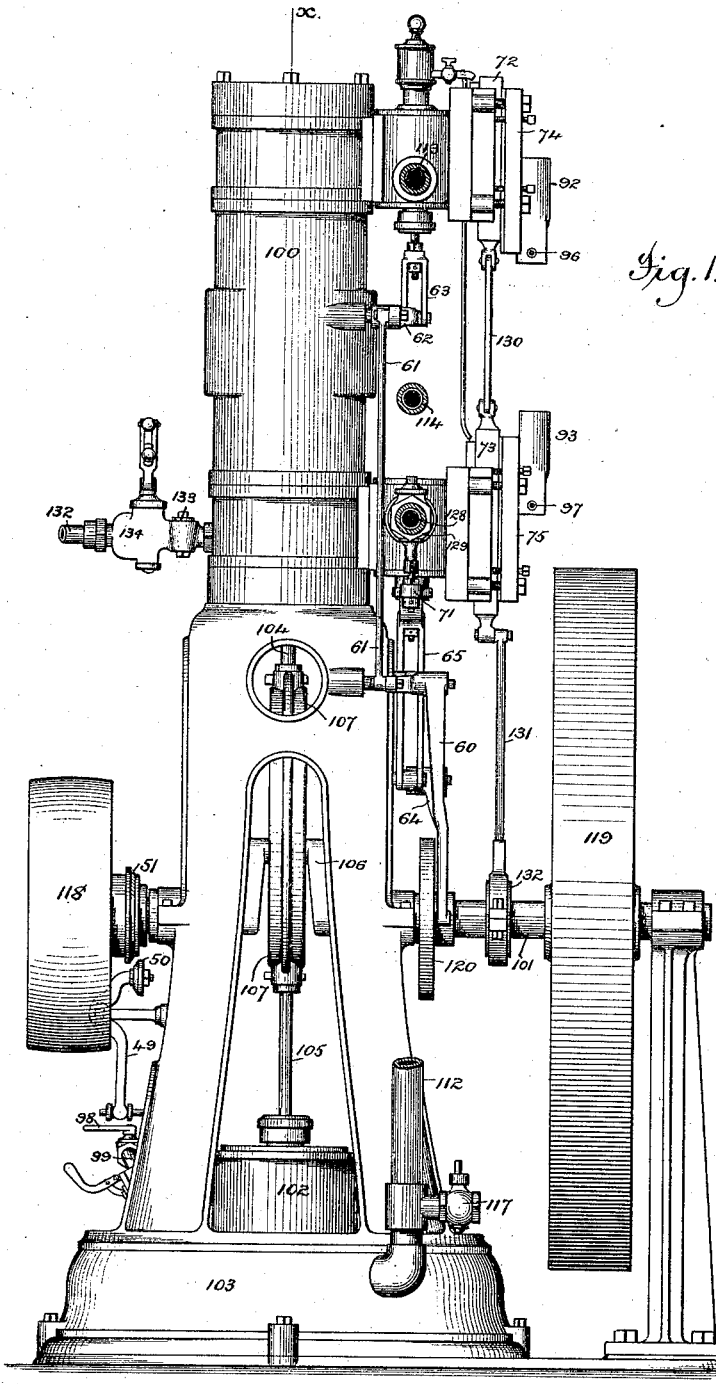

(No Model.)

P. MURRAY, Jr.
GAS ENGINE.

No. 305,464.  
Patented Sept. 23, 1884.

7 Sheets—Sheet 1.

Attest:  
Geo. H. Graham  
A. E. N. Jasbera

Inventor,  
Peter Murray Jr.,  
by Munson & Philipp  
Attys.

(No Model.)

P. MURRAY, Jr.
GAS ENGINE.

No. 305,464.

Patented Sept. 23, 1884.

7 Sheets—Sheet 3.

Attest:
Geo. H. Graham
A. N. Jasbera

Inventor.
Peter Murray Jr.,
by Munson & Philipp
Attys.

(No Model.) 7 Sheets—Sheet 4.
P. MURRAY, Jr.
GAS ENGINE.
No. 305,464. Patented Sept. 23, 1884.
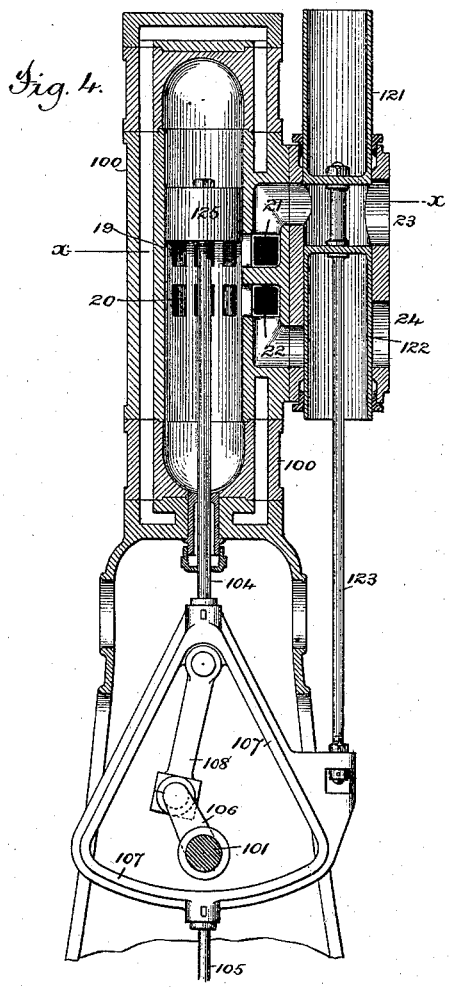
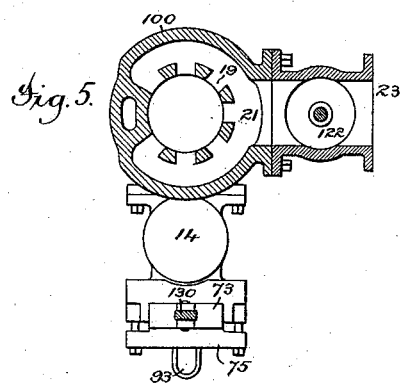
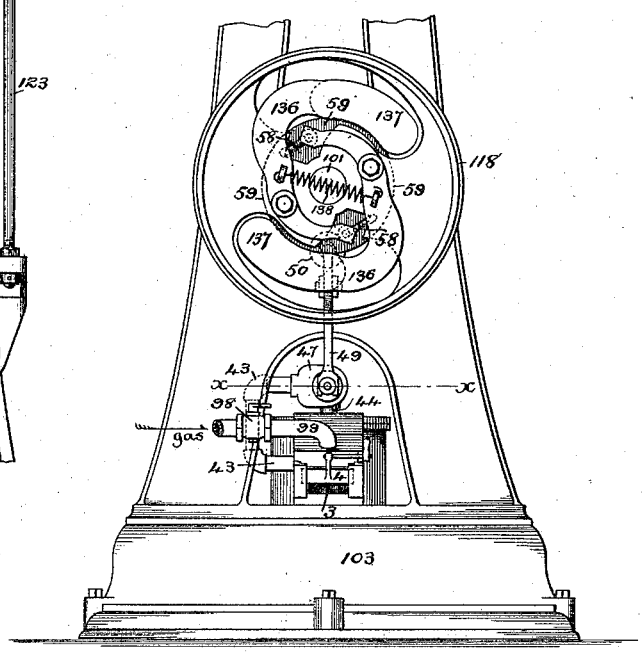
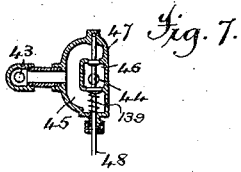
Attest:
Geo. H. Graham
A. F. Jasbera
Inventor,
Peter Murray Jr.,
by Munson & Philipp
Attys.

(No Model.)
P. MURRAY, Jr.
GAS ENGINE.
No. 305,464. Patented Sept. 23, 1884.
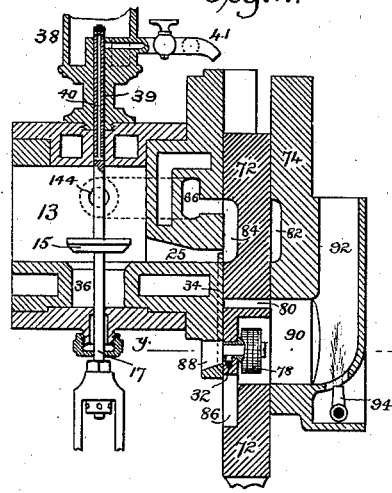
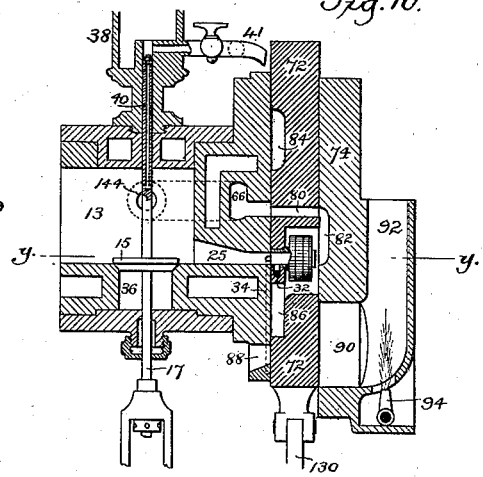
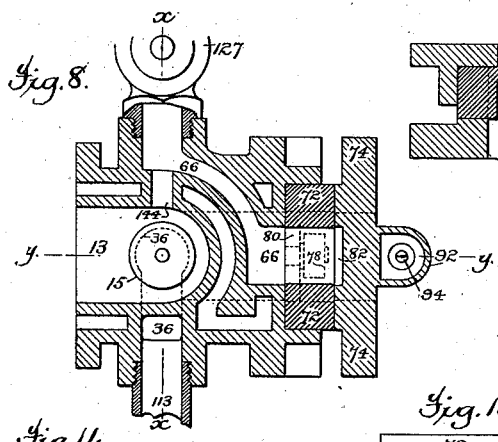
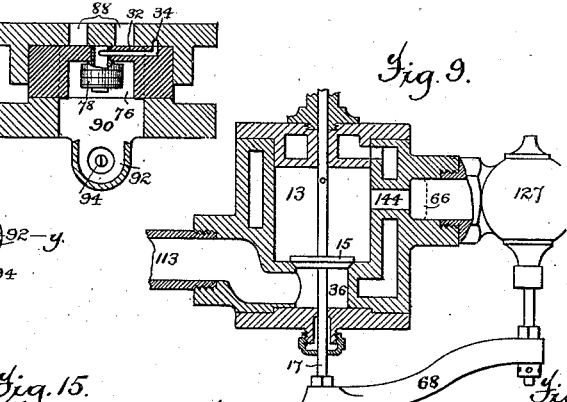
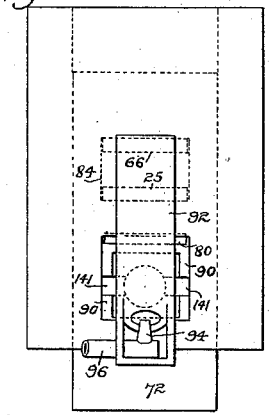
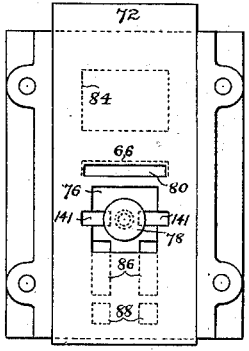
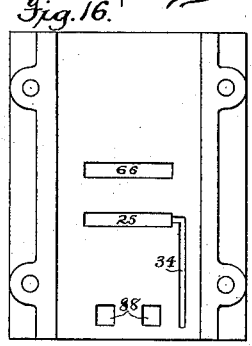
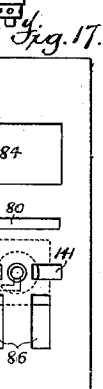
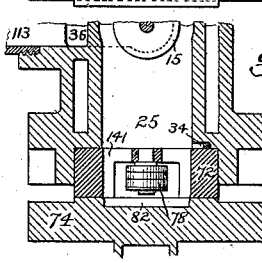
Attest:
Geo. H. Graham
A. N. Jasbera
Inventor:
Peter Murray Jr.,
by Munson & Philipp
Attys.

(No Model.) 7 Sheets—Sheet 6.

P. MURRAY, Jr.
GAS ENGINE.

No. 305,464. Patented Sept. 23, 1884.

Attest:
Geo. H. Graham
A. N. Jarbera

Inventor:
Peter Murray Jr.,
by Munson & Philipp
Attys.

(No Model.)

P. MURRAY, Jr.
GAS ENGINE.

No. 305,464.   Patented Sept. 23, 1884.

7 Sheets—Sheet 7.

Attest:
Geo. H. Graham
A. N. Jasbera

Inventor:
Peter Murray Jr.,
by Munson & Philipp
Attys.

UNITED STATES PATENT OFFICE.

PETER MURRAY, JR., OF NEWARK, NEW JERSEY, ASSIGNOR, BY DIRECT AND MESNE ASSIGNMENTS, TO THE MURRAY MOTOR MANUFACTURING COMPANY, OF SAME PLACE.

GAS-ENGINE.

SPECIFICATION forming part of Letters Patent No. 305,464, dated September 23, 1884.

Application filed October 27, 1883. (No model.)

*To all whom it may concern:*

Be it known that I, PETER MURRAY, Jr., a citizen of the United States, residing in the city of Newark, county of Essex, and State of New Jersey, have invented certain new and useful Improvements in Gas-Engines, fully described and represented in the following specification and the accompanying drawings, forming a part of the same.

This invention relates, generally, to that class of gas-engines in which the power is obtained by the explosion of a mixture of gas and air in the cylinder of the engine, and particularly to that class in which the explosive mixture is confined under a considerable pressure in the cylinder previous to being exploded.

It is the object of the invention to produce an engine of this class which will be more reliable and uniform in its action, and which will be capable of developing a higher degree of power than those heretofore produced.

The invention consists, generally, in devices for supplying the explosive mixture to a pump and for containing the explosive mixture received from the pump; in devices for introducing the explosive mixture to the cylinder of the engine; in devices for regulating the quantity of the mixture to be introduced into the cylinder at each stroke, and for varying the quantity so introduced according to the labor which the engine is performing at any particular time; in devices for igniting the explosive mixture in the cylinder; in devices for cleaning out the various ports and passages in the cylinder and its valves of the unconsumed products of combustion; in devices for utilizing the heat from the products of explosion, and various other devices for various purposes, all of which will be hereinafter particularly pointed out and claimed.

In a practical embodiment of the invention the air and gas which form the motor fluid are admitted in suitable proportions into a mixing-chamber, from which they are drawn by a pump and forced into a reservoir. This pump is provided with a suitable valve apparatus controlled by a governor connected with some moving part of the engine, by which the amount of the mixture in the tank is automatically regulated, so as to control the amount delivered to the cylinder of the engine. By this means the speed of the engine is made to control the quantity of the explosive mixture supplied to the cylinder, so that when the speed increases beyond what is desirable it is automatically decreased by a proportionate decrease in the mixture supplied to the cylinder. The reservoir just referred to communicates by a suitable conduit-pipe with inlet-valves, which are located at opposite ends of the cylinder, and opened and closed alternately by a cam mounted upon the main shaft of the engine. The main shaft of the engine is also provided with an eccentric, which, through suitable connections, operates the valves, which at the proper time open communication between the charges thus introduced into opposite ends of the cylinder and the igniting apparatus, so as to alternately fire the charges in the opposite ends of the cylinder, thus causing the piston to be acted upon while it is moving in both directions. The exhaust-ports of the cylinder are located near its middle, and communicate with an escape-pipe or chimney, through which the gaseous products of combustion escape into the open air directly, or through a pipe passing through the reservoir. These ports are controlled by valves operated from the main piston-rod of the engine, so as to be opened and closed at the proper times.

The details in construction of the organization thus outlined will now be described in connection with the accompanying drawings, in which—

Figure 2:
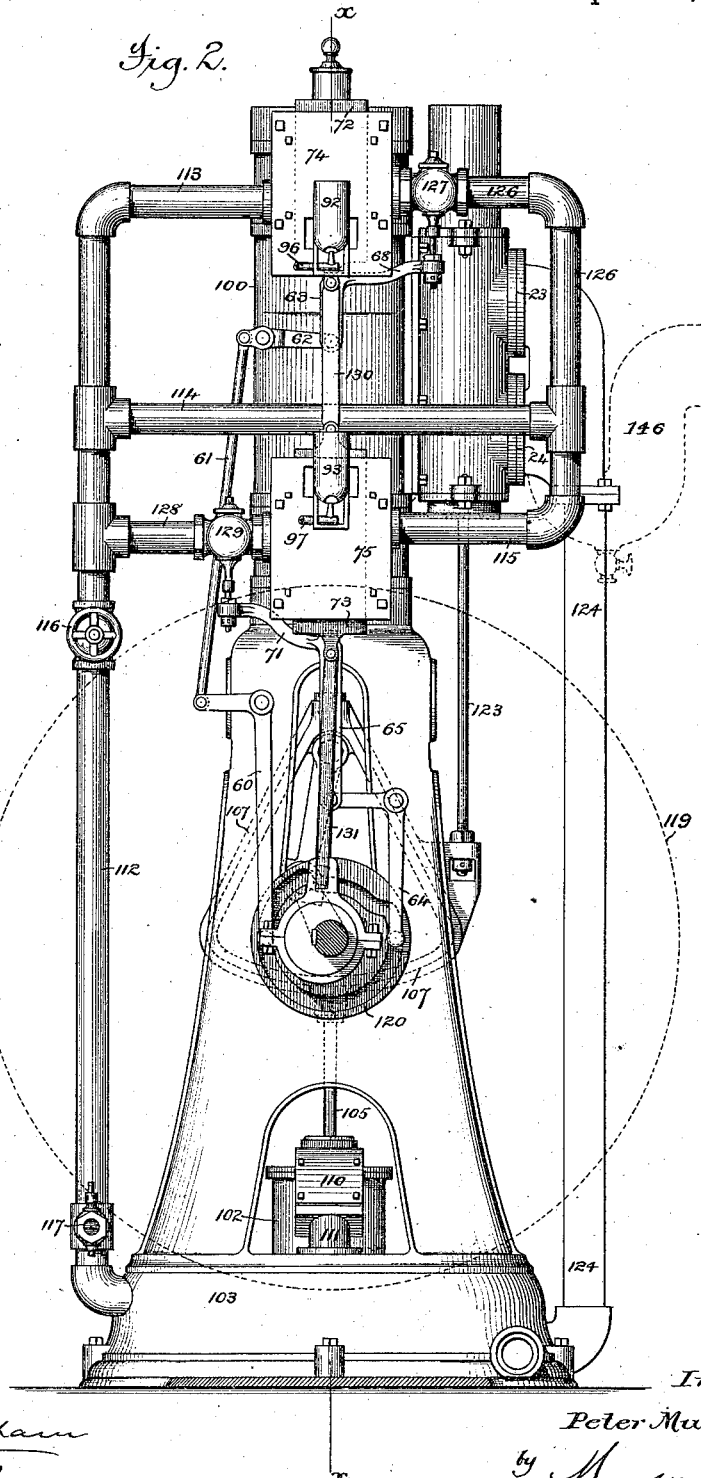
Figure 3:
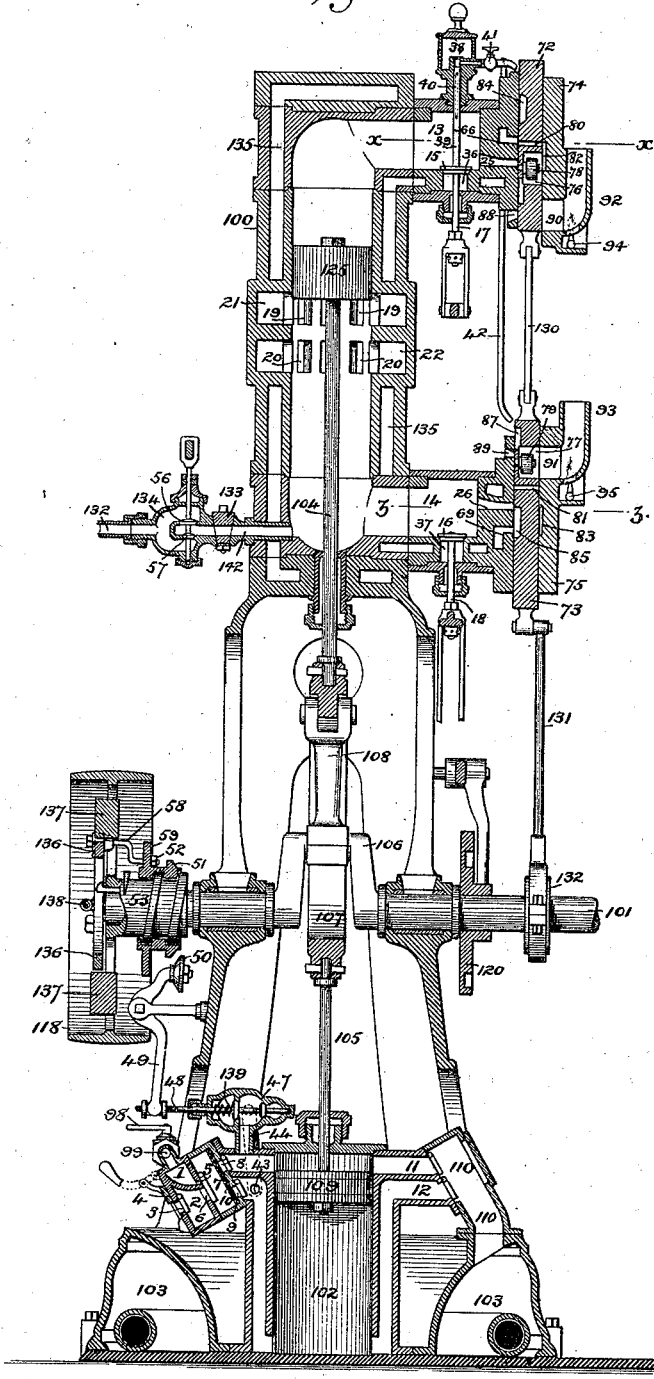
Figure 21:
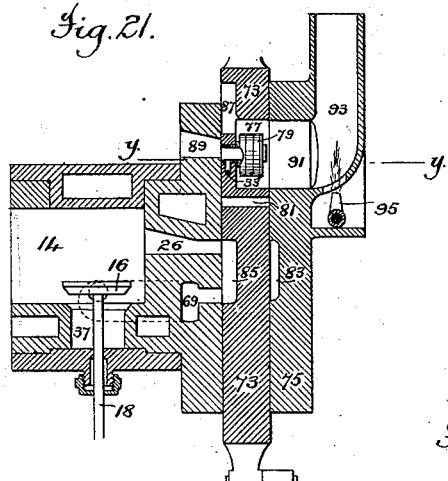
Figure 20:
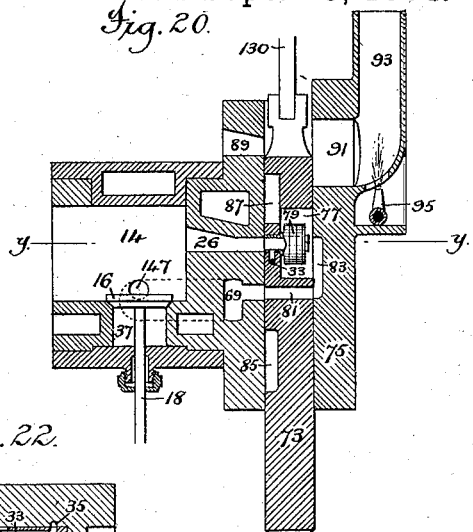
Figure 18:
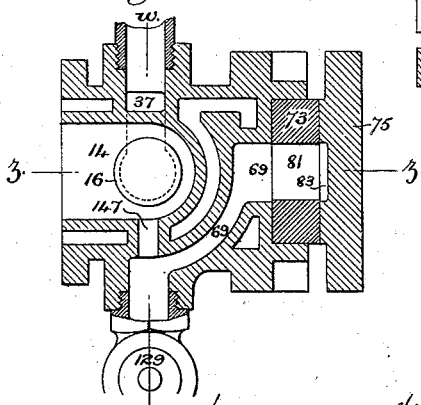
Figure 22:
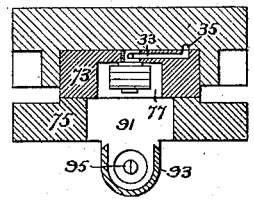
Figure 19:
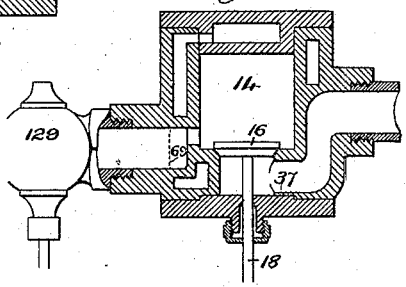
Figure 24:
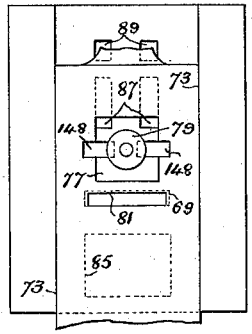
Figure 25:
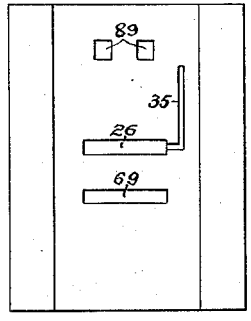
Figures 26, 27:
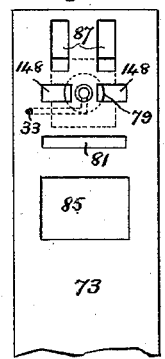
Figure 23:
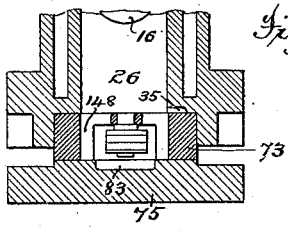
Figure 28:
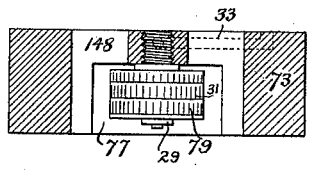
Figure 29:
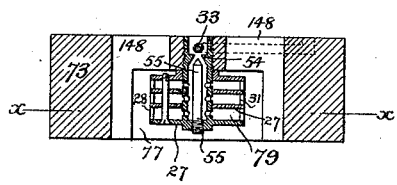
Figure 30:
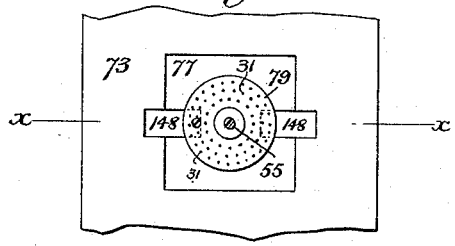
Figure 31:
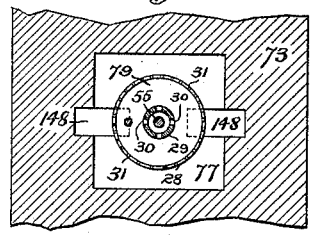
Figure 32:
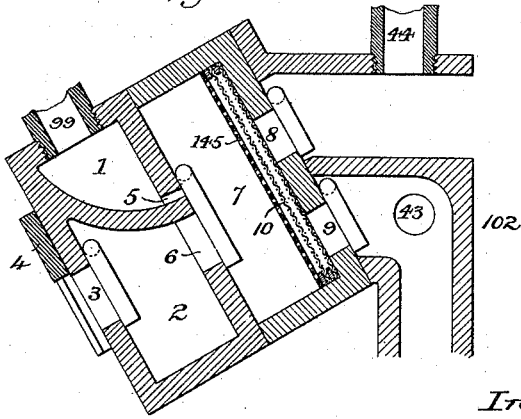

Figure 1 is a side elevation of a gas-engine embodying the invention. Fig. 2 is a like view, looking from the right of Fig. 1. Fig. 3 is a transverse sectional elevation of the same, taken upon the line *x x* of Fig. 2. Fig. 4 is a transverse sectional elevation of the power-cylinder, exhaust-ports, and valves, taken on the line *x x* of Fig. 1, showing in elevation the means for connecting the power-piston with the pump-piston rod and for converting the reciprocating into rotary motion. Fig. 5 is a horizontal section of the same, taken on the line *x x* of Fig. 4. Fig. 6 is a side elevation of the lower portion of the engine, looking from the left of Figs. 1 and 3. Fig. 7 is a horizontal section of the governor-valve, taken on the line *x x* of Fig. 6. Fig. 8 is an enlarged horizontal section taken on the line *x x* of Fig. 3, showing some of the valves, ports, and passages of the upper part of the power-cylinder. Fig. 9 is an enlarged vertical section taken on the line *x x* of Fig. 8. Fig. 10 is an enlarged vertical section taken on the line *y y* of Fig. 8, showing the induction-valve closed and the ignition-valve in a position to fire the charge. Fig. 11 is a similar section showing the induction-valve open, admitting a charge, and the igniting-valve in position for clearing a firing-port and lighting the igniting-burner. Fig. 12 is an enlarged horizontal section of the igniting-valve, its cover, and the side of the induction-valve chamber, taken on the line *y y* of Fig. 11. Fig. 13 is a like view taken on the line *y y* of Fig. 10, showing the igniting-valve in a position to fire the charge. Fig. 14 is an enlarged side elevation of the covering-plate for the upper igniting-valve, looking from the right of Fig. 1, and partially showing the igniting-valve and some of its ports in dotted lines. Fig. 15 is a like side elevation of the upper igniting-valve, with its covering-plate removed, showing some of the ports in the valve in dotted lines, and some of the ports in the induction-valve chamber. Fig. 16 is a like enlarged side elevation of the face of the upper induction-valve chamber. Fig. 17 is an enlarged view of the inner face of the upper igniting-valve. Fig. 18 is an enlarged horizontal section taken on the line *z z*, Fig. 3, showing some of the valves, ports, and passages of the lower part of the power-cylinder. Fig. 19 is an enlarged vertical section taken upon the line *w w* of Fig. 18. Fig. 20 is an enlarged vertical section taken on the line *z z* of Fig. 18, showing the induction-valve closed and the igniting-valve in a position to fire the charge. Fig. 21 is a similar section showing the induction-valve open, admitting a charge, and the igniting-valve in position for clearing the main firing-port and lighting the igniting-burner. Fig. 22 is an enlarged horizontal section of the igniting-valve, its cover, and the side of induction-valve chamber, taken on the line *y y* of Fig. 21. Fig. 23 is a like view taken on the line *y y* of Fig. 20, showing the igniting-valve in a position to fire the charge. Fig. 24 is an enlarged side elevation of the covering-plate of the lower igniting-valve, looking from the right of Fig. 1, and partially showing the igniting-valve and some of its ports in dotted lines. Fig. 25 is a like side elevation of the lower igniting-valve with its covering-plate removed, showing also some of the ports in the valve in dotted lines and some of the ports in the induction-valve chamber. Fig. 26 is a like enlarged side elevation of the face of the lower induction-valve chamber. Fig. 27 is an enlarged view of the inner face of the lower igniting-valve. Fig. 28 is an enlarged view of the lower igniting-valve, showing the igniting-burner in elevation. Fig. 29 is an enlarged cross-section of the same. Fig. 30 is an enlarged front elevation of said burner, showing parts of the lower igniting-valve. Fig. 31 is a vertical sectional view taken on the line *x x* of Fig. 29. Fig. 32 is an enlarged vertical section of the devices for mixing the gas and air before entering the pump.

Referring to said drawings, it will be seen that the power-cylinder 100 is supported in a vertical position upon a suitable frame-work, which also, at the proper distance below the cylinder, supports the main shaft of the engine. In the organization here shown the induction-valve at one end of the cylinder is opened to admit the explosive mixture to the cylinder 100 just as the piston of said cylinder arrives at the limit of its travel toward the opposite end of the cylinder, so that the mixture, instead of being drawn into the cylinder by the piston, is simply allowed to flow in. In order, therefore, that the cylinder may be quickly filled when the valves are opened, it is necessary that the mixture should be maintained at a pressure somewhat above that of the atmosphere. To effect this the engine is provided with a pump, 102, by which a supply of the mixture is constantly forced into and maintained at the proper pressure in a reservoir, 103.

For convenience, and to secure compactness in the structure, the pump will preferably be located, as shown in the present case, directly beneath the cylinder, and the reservoir will be of annular form, so as to surround the pump and form a base for the engine.

In order to simplify the construction and reduce the number of parts, it is preferable that the piston-rod 104, instead of having ordinary guides, should be provided with an open triangular frame, 107, which surrounds the shaft 101, and is connected at its apex to the crank 106 by a connecting-rod, 108, its base being attached directly to the piston-rod 105 of the pump. By this means not only is a direct connection formed between the piston-rod of the engine and the piston-rod of the pump, but the necessity of using cross-heads and bearings is obviated, and, as will hereinafter appear, a convenient means is afforded of transmitting motion without the use of intermediate devices to the rod of the exhaust-valves.

Referring now particularly to Figs. 3, 32, and 6, the apparatus by which the air and gas are mixed and maintained at the proper pressure in the reservoir 103 will be described. The gas to be used in the engine passes from the source of supply through a pipe, 99, and enters a chamber, 1, while the air required is drawn into a second but somewhat larger chamber, 2, through an aperture, 3. The relative proportions of gas and air which should be admitted into the chambers 1 2 will be determined by trial, as, in order to secure the best results, the proportion of each must be varied according to the quality of the gas. It therefore becomes impossible to determine these proportions accurately in advance. The pipe 99 is provided with a cock, 98, for admitting and cutting off the gas at pleasure. The aperture 3 is provided with a sliding gate, 4, which can be adjusted by hand or otherwise, for regulating the quantity of air admitted to the chamber 2. The chambers 1 2 are provided with apertures 5 6, through which the gas and air pass into and mingle in the third or mixing chamber 7, and this chamber is provided with two openings, 8 9, through which the mixture is alternately drawn into the pump 102 upon opposite sides of its piston 109. In order to secure the mixing of the gas and air, which is essential in order that the best results may be obtained when the mixture is exploded, the apertures 8 9 are covered by fine wire-gauze, 10, with a perforated plate, 145, to hold the same in position, through which the two fluids must be drawn in passing to the pump. By thus dividing the fluids into small streams they become greatly agitated, and so mingle more freely together and become more or less homogeneous. The apertures 8 9 are provided with ordinary hinged valves, which operate, in the manner common in air-pumps, to admit the fluid alternately upon the opposite sides of the piston 109, and the apertures 3 5 6 are provided with like valves, which serve to prevent the escape of the gas into the open air. The pump 102 is provided with two eduction-ports, 11 12, controlled by ordinary hinged valves, through which the mixture drawn into the pump is forced into a chamber and pipe, 110, which communicate with the reservoir 103.

The operation of this part of the apparatus is as follows: As the piston 109 ascends, a charge of mixed gas and air will be drawn from the chamber 7 through the aperture 9 into the pump below said piston, and as the piston descends a like charge will be drawn through the aperture 8 into the pump above said piston, while the charge already below the piston will be ejected through the port 12 into the reservoir. As the piston again ascends, the charge drawn in above the piston will be ejected through the port 11, while a fresh charge will be drawn in below the piston, and so the operation will be repeated, a charge of the explosive mixture being forced into the reservoir at each stroke of the engine. The pump will be made of such size that at each stroke it will draw from the chamber 7 and force into the reservoir 103 a quantity of the explosive mixture just equal to that which under ordinary conditions it is desired the engine shall consume at each stroke. The reservoir 103 is provided with a pipe, 112, which, through branch pipes 113, 114, and 115, communicates with valve-chambers 13 14 below the induction-valves 15 16 at the opposite ends of the cylinder 100, as shown in Figs. 2, 3, 8, 9, 10, 11, 18, 19, 20, and 21. The valves 15 16, as here shown, are ordinary puppet-valves, and are raised and lowered to open and close the induction-ports 36 37. It is not necessary, however, that these valves should be of this form, as sliding or oscillating may be used, if preferred; but in any case they should be positively opened. The pipe 112 is provided with an ordinary throttle-valve, 116, by which the flow of the explosive mixture to the cylinder of the engine can be shut off when desired, and also with an ordinary relief-valve, 117, which, in case the mixture in the reservoir 103 should become ignited through any accident, or the pressure in said reservoir should become too great, will afford relief and prevent damage to the apparatus. The main shaft 101, in addition to the usual belt-pulley, 118, and fly-wheel 119, is provided with a cam, 120, which, through a lever, 60, a link, 61, a second lever, 62, and a second link, 63, operates the rod 17 of the upper induction-valve, 15, and also, through a lever, 64, and a link, 65, operates the rod 18 of the lower induction-valve, 16. The cam 120 is here shown so constructed as to move the valves 15 16 positively in both directions, and this is found in practice the best arrangement, although springs may be used to close the valves, if preferred, and a cam or other means employed to positively open said valves.

Referring to Figs. 3 and 4, it will be seen that the exhaust-ports 19 20 are located at the middle of the length of the cylinder 100, and communicate with annular chambers 21 22, formed in the walls of the cylinder, the openings from which chambers are controlled by cylindrical valves or plungers 121 122, with a suitable space between them forming an exhaust-port, both of which are connected to and operated by a single rod, 123, which is attached to one side of the triangular frame 107, and therefore move in the same direction as the power-piston 125. The chambers 21 22 communicate with an exhaust-pipe, 124, which extends downward and passes through the reservoir 103, through which the gaseous products of combustion are conveyed and escape to the open air, imparting their heat to the gaseous mixture in the reservoir in so doing. This increases the temperature of the explosive mixture, which increases the expansive energy of the mixture when exploded. They may, however, pass into a pipe or chimney, 146, to the open air. (Indicated by dotted lines in Fig. 2.) The exhaust-valves 121 122 are so positioned with relation to the piston 125 that the exhaust-ports for each end of the cylinder will be partially opened before the piston 125 reaches the limit of its stroke toward the opposite end of the cylinder, and before it uncovers the exhaust-ports through which the products of the explosion are to pass out, and the connections through which the valves 15 16 are operated are so arranged that the induction-port for each end of the cylinder will be opened to admit the charge of the explosive mixture to that end of the cylinder in which the explosion has just taken place at or about the time that the exhaust-ports for the same end have become entirely uncovered by both the piston 125 and exhaust-valves 121 122, so that the incoming charge will expel the gaseous products of combustion left in the cylinder by the charge just exploded, and at the same time fill said exhaust-ports and the annular chamber connected therewith. The connections for operating the valves 15 16 are also so arranged that after the charge has been admitted to either end of the cylinder the valve controlling that end will be closed about the time that the piston on its return-stroke closes the said exhaust-ports, so that the charge thus admitted will be confined in the cylinder and compressed in front of the piston before it is exploded. The valve-chambers 13 14 are provided with ports 25 26, through which the charge compressed in the cylinder, as just described, is brought into communication with the flame for exploding the same, in a manner which will be presently explained.

In addition to the connections already described, the pipe 114 is provided with a branch pipe, 126, which communicates with an auxiliary port, 66, formed in the walls of the valve-chamber 13, as shown in Figs. 3, 8, 9, 10, and 11, which opens outward just above the port 25, as shown in said figures. The port 66 communicates with the chamber 13 through a port, 144, which is smaller in cross-sectional area than the port 66 and pipe 126. The pipe 126 is provided with a valve, 127, similar to the valve 15, the rod of which is connected by an arm, 68, with the link 63, so that the valves 15 and 127 will be operated simultaneously to admit the explosive mixture to and exclude it from the chamber 13 and the port 66. The pipe 112 is provided with a branch, 128, which communicates with a port, 69, similar to the port 66, formed in the wall of the chamber 13, the port 69 opening outward just below the port 26, as shown in Figs. 18, 19, 20, and 21. The port 69 also communicates with the chamber 14 through a port, 147. The pipe 128 is also provided with a valve, 129, similar to the valve 127, the rod of which is connected by an arm, 71, with the link 65, so that the valves 16 and 129 are operated simultaneously to admit the explosive mixture to and exclude it from the chamber 14 and the port 69.

The igniting apparatus is mounted in a pair of valves, 72 73, which slide between the faces of the valve-chambers 13 14 and covering-plates 74 75, and are connected by a rod, 130, and receive motion through a rod, 131, from an eccentric, 132, mounted upon the main shaft 101, as shown in Figs. 1, 2, and 3. The valves 72 73 are provided upon their outer faces with recesses 76 77, in which are mounted the ignition-burners 78 79. These burners consist of a series of disks, 27, provided at their outer edges with flanges 28, and mounted upon hollow studs 29, which are secured to and pass through the valves, so as to open inward upon their inside faces, as shown in Figs. 28 and 29. The studs 29 are provided with a series of small openings, 30, which communicate with the annular chamber formed between the disks, the flanges 28 and the outer disk, 27, being provided with a series of small openings or slots, 31, through which small jets of the mixed gas and air pass to feed the flame. The valves 72 73 are also provided with ducts 32 33, which pass laterally from the hollow studs 29, and then bend rearwardly, so as to open out upon the rear sides of the valves and communicate with channels 34 35, formed in the faces of the valve-chambers 13 14, and communicating with the ports 25 26, the arrangement of these ducts and channels being substantially the same in both valves, and is clearly shown in Figs. 12, 16, 17, 22, 26, and 27.

The studs 29 of the burners 78 79 are provided, just in front of the ducts 32 33, with valves, as 54, controlled by screw-rods 55, (see Fig. 29,) by which the quantity of the mixed gas and air which is allowed to pass to the burners can be regulated as may be required. The valves 72 73 are also provided with recesses 141 148, extending laterally from the recesses 76 77, and through the valves, as shown in Figs. 13, 15, 17, 23, 25, and 27. These recesses communicate at the proper time with the ports 25 26, for exploding the charge in the cylinder. The valves 72 73 are also provided with ports 80 81, which pass through them in the valve 72 just above the burner 78, and in the valve 73 just below the burner 79, and are so arranged as to open communication between the auxiliary ports 66 69 and recesses 82 83, formed in the inside of the plates 74 75, when the valves are in position for firing the charges in the cylinder, as shown in Figs. 10, 11, 15, 17, 20, 21, 25, and 27. These valves are also provided upon their inside faces with recesses, one, 84, being located just above the port 80, and the other, 85, just below the port 81, and in such position that when the valve 73 is in its extreme raised position it will open communication between the ports 26 69, and when the valve 72 is in its extreme depressed position it will open communication between the ports 25 and 66, as shown in Figs. 20 and 10.

In addition to the features already described, the valve 73 is provided upon its inner side with two ports, 87, located just above the burner 79, and so arranged as to afford communication between the recess 77 and a pair of openings, 89, formed in the upper end of the face of the valve-chamber 14, to admit air to the burner until just before it arrives in position to fire the charge in the cylinder, as shown in Figs. 3, 20, 21, 25, and 27. The valve 72 is provided with ports 86, and the face of the valve-chamber 13 with openings 88, corresponding to the ports and openings just described in connection with the valve 73, except that they are arranged in reverse order with relation to the burner 78, as will be seen by an inspection of Figs. 3, 10, 11, 15, 16, and 17.

The plates 74 75, in addition to the features already described, are provided with apertures 90 91, arranged in such position as to communicate with the recesses 76 77 141 148 in the valves, except at the time and for a short time before the latter arrive in position to fire the charges in the cylinder, as shown in Figs. 10, 14, 20, 24. The apertures 90 91 are provided at their outer ends with chimneys 92 93, at the bases of which are arranged the burners 94 95, which are supplied with gas through pipes 96 97, so as to be kept constantly burning.

The purpose of the various ports, ducts, recesses, &c., just described will be now explained in connection with the operation of the engine, which is as follows: The cock 98 and the slide 4 having been opened, so as to admit the gas and air into the mixing-chamber 7, the engine will be operated by hand or otherwise until the pressure of the mixed gas and air in the reservoir 103 is equal to or about equal to that of the atmosphere, the throttle-valve 116 being open, so as to allow the mixture in the reservoir to flow freely into the valve-chambers 13 14, beneath the induction valves. Let it now be supposed that the power-piston 125 has just commenced to move upward. As the power-piston 125 continues its upward movement, the piston 109 of the pump will also move upward, so as to force another charge of mixed gas and air into the reservoir 103, and thereby raise the pressure of the mixture in said reservoir above that of the atmosphere. By means of the construction and operation of the exhaust-valves the exhaust-chamber 21 is entirely open before the power-piston has entirely uncovered the exhaust-ports 19, and the chamber 22 is closed by them before the power-piston has uncovered the exhaust-ports 20. Just as the power-piston 125 reaches the limit of its upward movement the cam 120 will, through the connections already described, open the valves 16 and 129, so as to admit the mixed gas and air through the ports 26 69 147, recess 85, and chamber 14 into the lower end of the cylinder. The mixture, under the pressure which exists in the reservoir, will rush through the induction-port 37 and fill the cylinder below the power-piston 125, and will also pass through the exhaust-ports 19 and fill the annular chamber 21, and this flow from the tank will continue until its pressure is reduced to that of the atmosphere. As the crank 106 passes its center and the piston 125 in its descent has covered the exhaust-ports 19, the cam 120 will close the valves 16 129, so as to shut off the further ingress of mixture and confine the charge admitted in the lower end of the cylinder, and at the same time the rod 123 will move the exhaust-valves, and the valve 121 will close the exhaust-chamber 21. As the power-piston commences its descent, a small portion of the mixture confined in the cylinder will pass through the port 26 into the channel 35, and from thence into the duct 33 to the hollow stud 29 of the burner 79, from which a small portion will escape through the openings 30 and pass outward through the small openings 28 31 of the burner 79, where it will meet a current of air drawn in through the openings 89, ports 87, and recess 77 by the draft of the chimney 93 in the plate 75, and be ignited by the flame of the burner 95. After the time that the mixture from the burner 79 is ignited, the eccentric 132 will move the valve 73 downward, carrying with it the burner 79, which during its downward movement will continue to be fed by the mixture passing through the port 26, channel 35, and duct 33. The flame from the burner as the latter descends causes the air to pass more rapidly through the openings 89, ports 87, and recess 77, and out through the openings 91 into the chimney 93, carrying with it the products of the previous explosion remaining in the ports and recesses 87, 77, and 148, and thus cleaning the same. This is very important in gas-engines running at high speeds, for if these products were not removed the flame of the burner would be likely to be extinguished after the recess 77 had descended below the opening 91, and would thus fail to explode the charge in the cylinder. The aggregate area of the openings 30 in the stud 29 of the burner 79 is much less than the aggregate area of the openings 31 in the disks 27 and the flanges 28, so that the mixed gas and air, after passing through the former openings, will be allowed to expand considerably before it passes through the latter openings to be burned. By this arrangement the great and constantly-increasing pressure in the cylinder will not force the mixture outward so fast as to extinguish the flame of the burner, while by providing the burner with a large number of small jet-openings, as shown, the certainty of its being lighted by the flame of the burner 95 is insured, and at the same time a large area of flame is provided, which makes the ignition of the charge in the cylinder more rapid and certain. In order to prevent an unnecessary amount of the mixture from being consumed by the burners, the valve 54 will be so adjusted as to permit only a sufficient quantity of the mixture to pass to keep the burners supplied. As the power-piston 125 continues its descent, the piston 109 will also be forced downward, so as to inject another charge of gas and air into the reservoir 103, thereby again raising the pressure in said reservoir above the atmosphere, and at the same time the charge below the power-piston 125 will be greatly compressed, so that when it is exploded its propulsive energy will be proportionately increased. As the power-piston 125 reaches the limit of its downward movement and the charge in the cylinder is compressed to the full extent, the valve 73 will have arrived in such position (shown in Figs. 20 and 23) that the recesses 148 will come opposite the port 26, and the mixture coming in contact with the flame of the burner through such recesses will communicate the flame of the burner to the charge in the cylinder. The port 81 will be brought opposite the port 69 slightly in advance of the recesses 148 coming opposite the port 26, (which is the preferred form of construction,) and the flame of the burner will also be communicated, through the recess 83, port 81, and ports 69 and 147, to the charge in the cylinder, thus exploding the latter. As the pressure of the gas which has been forced into the port 69 through the port 147 from the cylinder by the descent of the power-piston will be communicated through the port 81 and recess 83 to the front of the burner, thereby establishing substantially an equilibrium of pressure upon both sides of the burner, this will insure the flame of the burner being instantly communicated, through the recesses 148 and port 26, and the recess 83 and ports 81, 69, and 147, to the charge in the cylinder, as just described. At the same time that the power-piston 125 arrives at the limit of its downward stroke and has the charge exploded in front of it, as just described, the ignition-valve 72 will also be at the limit of its downward movement, so that the recess 84 in the valve will be in position to open communication between the ports 25 and 66, as shown in Fig. 11, and the cam 120 will, through the connections described, raise the induction-valves 15 and 127 and admit a charge through the ports 36, 66, and 144, recess 84, and port 25 into the cylinder above the piston, and this charge, rushing in until the pressure in the reservoir is reduced to that of the atmosphere, will fill the upper end of the cylinder, and, passing through the exhaust-ports 20, will also fill the annular chamber 22. Before the power-piston in its descent has begun to uncover the ports 19 the exhaust-valves will have moved to close the chamber 21, and before it has uncovered the exhaust-ports 20 they will have opened the chamber 22. As the power-piston commences to ascend from the force of the exploded charge below it, the valves 15 and 127 will be closed, as just described, to confine the charge of mixture admitted above the piston, and the exhaust-valve 122, having closed the chamber 22, will prevent the escape of the charge which has passed into said chamber 22. As the piston continues its upward movement, the charge in the upper end of the cylinder will pass through the port 25, channel 34, and duct 32 to the burner 78, which will be ignited by the flame of the jet 94, this being aided by a current of air drawn through the openings 88, ports 86 and recess 76, and openings 90 by the draft of the chimney 92, as already similarly described in connection with valve 73, and the flame from it, as it ascends, will cause the air to pass more rapidly through said ports and recesses to the chimney 92, to clean out the products of the previous explosion, as also already described with reference to the valve 73. As soon as the piston has moved sufficiently far upward to uncover the ports 20, that portion of the mixture which was passed into the chamber 22 from above the piston will be exploded by the flame in the cylinder, and thus give an additional impulse to the piston near the end of its stroke, which additional impulse will, to a considerable extent, compensate for the decrease in power incident to the expansion of the exploded mixture in the cylinder, and thus tend to give a uniform propulsive power to the engine throughout the entire stroke. When the piston has again reached the limit of its upward stroke, the valve 72 will have arrived in such position as to bring the recesses 141 of the valve opposite the port 25, and the port 80 into such position as to open communication between the ports 66 and the recess 82, such communication being made slightly in advance of the recesses 141 coming opposite the port 80, (which is the preferred form of construction,) so as to establish an equilibrium of pressure upon the opposite sides of the burner 78. This will cause the charge above the piston to be exploded in the manner just described and the piston to again commence its downward stroke. At the time the charge above the piston is exploded the valves 16 and 129 will be again opened, so as to admit a fresh charge below the piston, and this charge, rushing in under the pressure which exists in the reservoir 103, will drive the gaseous products of combustion remaining in the cylinder before it and expel them through the exhaust-ports 19, and at the same time fill the annular chamber 21, as before described. That portion of the charge which is admitted through the valve 129, and allowed to pass to the cylinder through the ports 69, 26, and 147, will serve to drive all the gaseous and other products of combustion out of these ports, and thus prevent them from becoming so filled with these products as to obstruct the proper working of the igniting apparatus. When the piston has passed sufficiently far downward to uncover the ports 19, that portion of the mixture which has passed into the chamber 21 from below the piston will be exploded by the flame resulting from the explosion in the upper end of the cylinder, and thus serve to give an additional impulse to the piston in its downward stroke. When the piston reaches the limit of its second downward movement, a second charge will be admitted into the upper end of the cylinder, in the manner already described, so as to drive the gaseous and other products of combustion remaining in the cylinder out through the ports 20, and at the same time that portion of the charge admitted through the valve 127 will operate to remove the products of combustion from the ports 25, 66, and 144, in the same manner as already described in connection with the corresponding ports with which the valve 73 works, and so the operations will continue to be repeated as long as the mixture is allowed to flow through the pipe 112. When the power-piston in its upward stroke has passed the ports 20 and the charge in them and the chamber 22 has been exploded, they will be filled with the products of the explosion, and the mixture that enters that end of the cylinder will not, for this reason, pass into the same when the valves 16 and 129 are open, and the same is true of the ports 19 and chamber 21 when the piston in its descent has uncovered the same.

When the engine is of the vertical form, as herein shown, it will be readily seen that the soot and other unconsumed products of combustion which accumulate in the upper end of the cylinder will naturally collect on top of the piston, and will be driven out through the exhaust-ports 20 by the force of the incoming charges. This, however, will not be the case with these products which accumulate in the lower end of the cylinder, as such products will naturally collect at the bottom of the cylinder and in such position that they cannot be forced out through the ports 19. The cylinder is therefore provided at its lower end with a cleaning-pipe, 142, having a cock, 133, and a weighted or spring-seated valve, 134, so that when it is desired to remove these waste products of combustion from the cylinder it may be done by simply turning the cock 133, so as to open the passage through the pipe 142. The two disks 56 57 of the valve 134 are so proportioned that the pressure of the mixture in the cylinder will not raise the valve, but that when the explosion occurs the greatly-increased pressure will raise the valve and allow a small portion of the exploded mixture to escape through the pipe 142, and in so doing carry out the soot and other matter collected in the bottom of the cylinder. When the cylinder has been thus cleaned, the cock 133 will be turned so as to close the pipe 142 and prevent all escape of the exploded mixture until cleaning again becomes necessary.

To stop the engine it is only necessary to close the throttle-valve 116. When this is done, no more of the mixture can enter the cylinder, but the momentum of the engine will cause it to move for some little time after the throttle-valve has been closed, which will cause the pump to still act, drawing in and forcing the mixed air and gas into the reservoir 103. This operation is very important in the practical use of the gas-engine, as there will be enough of the mixture in the reservoir when the engine has finally stopped to enable it to be started again, and when this pressure has been once established in the reservoir it will always exist there upon the stoppage of the engine, unless a leak or explosion accidentally takes place. If desired, a supplemental pump can be connected to the reservoir 103, provided with gas and air supplies, in order that the reservoir may be charged with the mixture to start the engine. With the reservoir 103 charged with the mixture the only operations required to set the engine in motion after it has once been running and has stopped are the opening of the throttle-valve and the turning of the main shaft until one of the induction-valves has been opened to admit a charge upon one side of the piston, and the igniting-valve moved into position to fire said charge. It may be remarked in passing that the cylinder 100 and the valve-chambers of the engine are provided with the usual water-spaces, 135, through which water is caused to circulate to prevent the parts from becoming unduly heated.

In order to properly lubricate the piston 125 and the rod 104 where it passes through its stuffing-box in the end of the cylinder, the upper valve-chamber is provided with an oil-cup, 38, the bottom of which has an opening forming an elongated bearing for the rod 39, being an extension of the valve-rod 17. This rod 39 is provided with a central channel, 40, extending from its top to a hole or holes in it, communicating with the valve-chamber 13. In the upper end of this channel is a screw, which closes it there. Extending laterally from the channel just below the end of this screw to the outside of the rod 39 is a hole or holes, the size of which can be regulated by this screw. When the induction-valve is in its raised position, the channel 40 through the hole or holes which communicate with its upper end, and which at this time are above the bearing for the rod 39, opens communication between the cup 38 and the valve-chamber 13 through the hole or holes at its lower end; but when the valve is closed this channel communicates only with the chamber 13. From this arrangement it results that as the valve 15 is raised a small quantity of oil is allowed to flow through the channel 40 and enter the chamber 13. As each charge of the mixture is admitted into the upper end of the cylinder, this charge carries more or less of the oil which enters the valve-chamber into the cylinder, where by the explosion it is distributed around the walls of the same, so as to lubricate the piston. Some of this oil finds its way past the piston, and, falling to the bottom of the cylinder, collects around and lubricates the rod 104. The oil-cup 38 is also provided with an orifice, the passage to which connects with the opening forming the bearing for the extension 39, and a cock, 41. When the charge is admitted into the upper end of the cylinder, the valve 15 will be raised and the upper end of the rod 39, passing the orifice to the cock 41, will close the same and prevent the pressure of the gaseous charge from forcing out the oil in the cup 38 through the cock. Upon the seating of the valve 15 its rod 39 will open the orifice to the cock and allow the oil to flow by gravity through the same. The nozzle of this cock lies in close proximity to the valve 72, so that by turning the cock oil can be supplied to the valve as needed. The cock 41 is also provided with a pipe, 42, which terminates in close proximity to the valve 73, by means of which oil is conducted to and supplied to that valve at the same operation.

As the labor which the engine is called upon to perform is liable to vary at different times, it is desirable to provide means by which the quantity of the explosive mixture supplied to the cylinder can be regulated to conform to these different conditions. For this purpose the pump 102 is provided with a valve apparatus connected with a governor, which operates, when the speed of the engine increases beyond what is desirable, to diminish the quantity of gas and air forced into the reservoir 103, thereby reducing the pressure in said reservoir, and consequently the quantity of the mixture delivered to the cylinder at each stroke. To effect this the pump 102 is provided upon opposite sides of its piston with pipes 43 44, which communicate with chambers 45 46 upon the opposite sides of a balanced valve, 47, the rod 48 of which is connected with one end of a lever, 49, the opposite end of which is provided with a bowl, 50, which lies in close proximity to the flange 51 of a screw-threaded sleeve, 52, which surrounds the threaded hub 53 of the belt-pulley 118. This pulley 118 is provided upon the inside of its rim with a pair of pivoted levers, 136, the outer ends of which are provided with weights 137, while their inner ends are connected by rods 58 with the flange 59 of the sleeve 52. The levers 136 are provided with a suitable spring, 138, connected to each, which, when the engine is running at its normal speed, holds the weights 137 inward away from the rim of the pulley, as shown in Figs. 3 and 6. When, however, the speed of the engine is accelerated, the centrifugal force of the weights 137 will overbalance the tension of the spring 138 and allow the weights to take positions nearer to the rim of the pulley, and in so doing they will rock the levers 136, so as to give the sleeve 52 a partial turn upon the hub 53 and cause the sleeve to move inward a short distance. This will bring the flange 51 into contact with the bowl 50 of the lever 49, thereby rocking the lever and opening the valve 47. As soon as the valve 47 is opened, the whole or a part of the mixed gas and air, depending upon the amount of opening of the valve, instead of being forced through the ports 11 12 into the reservoir, will simply pass through the pipes 43 44 from one end of the pump to the other. This failure of the pump to force its full charge into the reservoir will at once reduce the pressure in the latter and proportionately diminish the charges delivered to the cylinder, and this in turn will cause a reduction in the speed of the engine. As soon as the engine has fallen back to its normal speed, the spring 138 will again draw the weights 137 inward, thereby withdrawing the flange 51 from the bowl 50, and permitting the spring 139 to close the valve 47.

As hereinbefore stated, the proportions of gas and air which should enter into the explosive mixture will vary with the quality of the gas used, and can therefore be determined only by trial. For this reason, as before stated, the gate 4 has been provided, so that the quantity of air admitted to the mixing-chamber can be varied at pleasure. This performs another very important function, which will now be explained.

It will be observed that the aperture 3, through which the air passes to the mixing-chamber, communicates directly with the open air, from which it results that the air passes to the mixing-chamber under just the pressure of the atmosphere, while the gas, as is usual, is admitted to the mixing-chamber under a pressure considerably greater than that of the atmosphere. This difference in the pressure at which the two fluids are introduced into the mixing-chamber, as well as the speed at which the engine is to be operated, are elements which must be taken into consideration in securing the proper adjustment of the gate 4, as any adjustment of said gate which would serve to admit the proper proportions of gas and air with the gas at a given pressure would not hold good if the pressure of the gas were changed; neither would an adjustment which would serve to admit the proper proportions of gas and air with the engine running at a given speed hold good if the speed of the engine were changed. To make this clear, let it be supposed that the engine and the pump are running at their minimum speed, and also that when so running the gas-opening is of such size that the gas, under the pressure which exists in the pipe 99, will be forced through said opening sufficiently fast to fully supply the pump. It is manifest that under such conditions as these no air would be drawn into the mixing-chamber, no matter how large the air-opening. Let it now be supposed that the speed of the engine is doubled, the area of the gas-opening remaining the same. It is manifest that under such conditions the quantity of gas which will be forced through the gas-opening will not be sufficient to fully supply the pump, and that as a consequence a quantity of air will be drawn through the air-opening to supply the deficiency; and so it has been found in practice that, the air and gas openings remaining the same, the proportion of air which will be drawn into the pump will be increased and the proportion of gas diminished as the speed of the engine increases, and vice versa. It has also been found in practice that this difficulty can be obviated and the same relative proportions of gas and air preserved in the explosive mixture at all speeds of the engine by decreasing the area of the air-opening as the speed of the engine increases, and vice versa; and it is for this purpose, as well as for that hereinbefore mentioned, that the adjustable gate 4 is provided.

Although in the accompanying drawings the invention is shown as embodied in a vertical double-acting engine, such being, all things considered, the best form, yet it will be seen that the parts may be so arranged, without material departure from the principle of the invention, that the engine may occupy a horizontal instead of a vertical position, and it will also be seen that many features of the invention can be applied with equal advantage to single as well as double acting engines.

In applying my inventions to a single-acting engine the valves and other appliances already described may be omitted from one end of the cylinder, the use of the exhaust-valves entirely dispensed with, or they may be held stationary to open one set of exhaust-ports. That set of the exhaust-ports farthest away from the power-piston, when it has reached the limit of its stroke to which it is driven by the explosion, may be dispensed with in case the exhaust-valves are, but can be retained, though not used, in case the exhaust-valves are retained and held out of operation, as just described. The pump should be reduced one-half in size, or one of the induction-valves leading from the mixing-chamber held closed, an opening being made from the pump to the open air on that side of the piston when said valve is held closed. In this case, however, there will be no supplemental charge to assist by its explosion in making the piston complete its power-stroke.

Although I have shown and described ports 146 69 81 and recess 82 for the upper part of the cylinder, and ports 144 66 and recesses 84 and 82 for the lower part of the cylinder, for assisting in exploding the charges at each end of the cylinder, these ports and recesses are not absolutely necessary for this purpose, and, so far as the exploding of the charge is concerned, may be dispensed with, and yet the other devices also employed in exploding the charge may be used alone; or these ports and recesses might be employed for this purpose alone and the ports 25 and 26 dispensed with, the channels 34 and 35 being then otherwise put in communication with the induction-valve chamber; but in either of these cases the engine could not be run at as high a speed as in case they were both employed. The operation of the ports and recesses 147 69 81 and the ports and recesses 144 66 82 could also be prevented in assisting the explosion of the charges in the cylinder, and they be retained for the purpose of clearing the ports 25 26, as before described, by simply stopping up the ports 144 147.

It is also to be understood that the engine just described may be modified as to many other of its details than what has been already described without departing from the principle or losing the advantages of the invention.

Instead of the cock 133 being used with the clearing-pipe 142 and valve 134 for the purpose of cleaning out the lower end of the cylinder of the engine, the cock 133 may be dispensed with and the valve 134 positively forced to its seat by any convenient means, and thus the same results be produced as by the employment of both the cock and the valve.

The pump may in some cases be arranged above or at one side of the power-cylinder instead of below it, especially when it is desired to utilize my invention in engines for stamp-mills, hammers, and other such machines.

The heat of the products of explosion may be utilized to heat the explosive mixture before it enters the power-cylinder by passing it from the exhaust-ports into a reservoir in which is a coiled pipe or a series of pipes, through which the mixture is forced before entering the cylinder.

The exhaust-pipe might be large enough to permit the pipe conveying the mixture to the cylinder to lie within the same, so that the products of explosion in escaping would pass over said conveying-pipe; or the products of the explosion might be utilized to heat the mixture in other ways without departing from the spirit of my invention.

Having thus described the invention, what I claim as new is—

1. In a gas-engine, the combination of a mixing-chamber provided with a gas-inlet, with an adjustable gate controlling an air-opening to said mixing-chamber, and a pump for drawing the gas and air into the said mixing-chamber, substantially as described.

2. The combination of a gas-chamber, 1, with an air-chamber, 2, of a larger area than the gas-chamber, provided with a valve opening inward, a mixing-chamber connected by apertures with said gas and air chambers, a valve opening into said mixing-chamber for controlling said apertures, and a pump with openings between said mixing-chamber and the pump-cylinder, and with an induction valve or valves opening from said mixing-chamber toward the pump, substantially as described.

3. The combination of a gas-chamber, 1, with an air-chamber, 2, of a larger area than the gas-chamber, provided with a valve opening inward, a mixing-chamber provided with wire-gauze, and a perforated plate in front of the same connected by apertures with said gas and air chambers, a valve opening into said mixing-chamber, for controlling said apertures, and a pump with openings between said mixing-chamber and the pump-cylinder, and with an induction valve or valves opening from said mixing-chamber toward the pump, substantially as described.

4. The combination of a gas-chamber, 1, with an air-chamber, 2, of a larger area than the gas-chamber, provided with a valve opening inward, a mixing-chamber connected by apertures with said gas and air chambers, a valve opening into said mixing-chamber, for controlling said apertures, and a pump with openings between said mixing-chamber and the pump-cylinder, and with an induction valve or valves opening from said mixing-chamber toward the pump, a reservoir for receiving the mixture of gas and air from the pump, and a valve or valves opening outward from the pump, substantially as described.

5. In combination with a pump and valves controlling the openings to the pump for the gas and air mixture, a passage connecting the two sides of the pump between said valves and the pump-piston, a valve for controlling said passage, and a governor operated by the engine for actuating said last-mentioned valve, substantially as described.

6. In combination with weighted levers pivoted to a revolving support, a spring for drawing the weighted ends of said levers toward the center of said revolving support, a loose internally-screwed sleeve connected to and operated by said weighted levers, a threaded support upon which said screwed sleeve works, a valve operated by said sleeve, and a pump having a passage connecting the two sides of the same controlled by said valve, substantially as described.

7. In combination with the weighted levers pivoted to a revolving support, a spring for drawing the weighted ends of said levers toward the center of said revolving support, a loose internally-screwed sleeve connected to and operated by said weighted levers, a threaded support upon which said screwed sleeve works, a valve operated by said sleeve, and a lever for actuating said valve, provided with a bowl against which the threaded sleeve works, and a pump having a passage connecting the two sides of the same controlled by said valve, substantially as described.

8. The combination of the pulley 118, the levers 136, provided with weights 137, pivoted to the web of said pulley, and curved so as to lie properly within the same, a spring, 138, for drawing the weighted ends of said levers toward the center of the pulley, an internally-screwed sleeve, 52, connected by rods 58 with the ends of said levers, a threaded hub, 53, forming part of said pulley, and secured to the main shaft of the engine, and a lever for operating a valve, provided with a bowl running in contact with the beveled flange 51 of said internally-screwed sleeve, and a pump having a passage connecting the two sides of the same and controlled by said valve, substantially as described.

9. The combination, with the cylinder of a gas-engine, of a pipe for receiving the products of explosion of the gaseous mixture, and a reservoir for containing said mixture, through the interior of which said pipe passes to the open air, so that said products will heat said mixture in passing through said pipe, substantially as described.

10. The combination, with a power-cylinder and its piston, of a double-acting gas-engine with exhaust-ports arranged at or about the middle of said cylinder, and an induction-valve controlling the admission of the gaseous mixture at each end of the cylinder, whereby the gaseous mixture is admitted to the cylinder after the exhaust-ports are partially or wholly opened, substantially as described.

11. The combination, with a power-cylinder and its piston, of a double-acting gas-engine with exhaust-ports arranged at or about the middle of said cylinder, an induction-valve controlling the admission of the gaseous mixture at each end of the cylinder, and a reservoir for containing the gaseous mixture, whereby the gaseous mixture is admitted from the reservoir to the cylinder after the exhaust-ports are partially or wholly opened, substantially as described.

12. The combination, with a power-cylinder and its piston, of a double-acting gas-engine with exhaust-ports arranged at or about the middle of said cylinder, and an induction-valve controlling the admission of the gaseous mixture at each end of the cylinder, and a piston-rod passing through the end of said cylinder, substantially as described.

13. The combination of an exhaust valve or valves and a rod connecting the same with the open frame joining the power and pump piston rods, substantially as described.

14. The combination of a reservoir for the explosive mixture, a power cylinder and piston, and an induction valve or valves positively opened to admit a charge or charges of said mixture to said cylinder, and exhaust-ports opened by the power-piston, substantially as described.

15. In combination with the power cylinder and piston, two sets of exhaust-ports, the chambers with which they connect, and valves for opening one of said chambers to the exhaust-pipe, and at the same time closing the other of said chambers, substantially as described.

16. The combination of a reservoir for containing the gaseous mixture under pressure, a power-piston, its cylinder provided with exhaust-ports placed so as to be entirely opened upon the completion of a stroke of said piston, an induction-valve positively opened to admit a charge of the explosive mixture from the reservoir to the power-cylinder at that end of it in which the explosion has just taken place, and after the power-piston has uncovered the exhaust-ports for that end of the cylinder to force out the products of said explosion, substantially as described.

17. In a gas-engine, a cylinder provided with one or more sets of ports opening into a chamber or chambers to receive explosive mixture not compressed by the power-piston, which is exploded after the explosive mixture compressed by the power-piston has been exploded and by the products of such explosion, substantially as described.

18. The combination of a cylinder of a double-acting gas-engine with two sets of exhaust-ports arranged at the middle thereof, a power-piston, an induction-valve for each end of said cylinder, and exhaust-valves, the operation being such that the set of such exhaust-ports that allows the products of combustion to escape on the piston uncovering them also receives a part of the charge of the explosive mixture, and on the piston passing the same on its return this part is exploded by the products of the explosion of the charge compressed on the other side of the piston, thus aiding the latter in completing its stroke, substantially as described.

19. In a gas-engine, the combination, with the power-cylinder, of a valve provided with a burner, and two ports at either end of the cylinder, which are put in communication with the burner in the valve—one in advance of the other—at the time a charge in the cylinder is to be exploded, so that said charge will be fired at two points, substantially as described.

20. The combination of the power-cylinder, provided with a port, 25 or 26, and a channel, 34 or 35, communicating therewith, with a valve provided with a burner supplied by a part of the explosive mixture in the power-cylinder through a duct, 32 or 33, communicating with a channel, 34 or 35, and a recess, 76 or 77, in which said burner is located, and recesses 141 or 148 in the said valve, substantially as described.

21. The combination of the power-cylinder, provided with a port, 25 or 26, and a channel, 34 or 35, communicating therewith, and with a port, 66 or 69, and a port, 144 or 147, with a valve provided with a burner supplied by a part of the explosive mixture in the power-cylinder through a port, 32 or 33, communicating with a channel, 34 or 35, a recess, 76 or 77, in which said burner is located, a recess, 141 or 148, in the valve, a port, 80 or 81, and a recess, 82 or 83, in the valve-cover, substantially as described.

22. In combination with an auxiliary port communicating with a supply of explosive mixture under pressure, a device for controlling said communication, and a valve for placing such port in communication with a port, 25 or 26, in the cylinder when the said device has opened communication between said port and the supply to drive out the products of the previous explosion from said ports and valve, substantially as described.

23. The combination, with a port, 25 or 26, communicating with the interior of a power-cylinder, an auxiliary port, 66 or 69, communicating with a supply of explosive mixture under pressure, a valve for controlling said communication, and a recess, 84 or 85, in a valve, 72 or 73, substantially as described.

24. The combination, with a power-cylinder, provided with an auxiliary port, 66 or 69, and a port, 144 or 147, communicating with it and the said cylinder, of a valve provided with a port, 80 or 81, a recess in which is located a burner supplied with the burning-fluid, and a recess in the valve-covering plate, 82 or 83, substantially as described.

25. The combination of a power-cylinder, provided with an auxiliary port, 66 or 69, and a port, 144 or 147, forming a communication between the said auxiliary port and the interior of said power-cylinder, a channel, 34 or 35, communicating with the interior of the cylinder, with a valve provided with a burner supplied by a part of the explosive mixture in the power-cylinder through a duct, 32 or 33, communicating with the channel 34 or 35, and a recess, 76 or 77, in which said burner is located, and a valve-covering plate provided with a recess, 82 or 83, substantially as described.

26. The combination of an igniting-valve provided with a burner located in a recess in said valve, a port or ports for placing said recess in communication with the air when the burner is to be lighted after each explosion, an aperture through the valve-cover communicating with said recess when the burner is being lighted, and a stationary burner and chimney in front of said aperture, whereby, after the burner in the valve has been ignited, air will be caused to pass through said port or ports and recess to clear the same of the products of the previous explosion, substantially as described.

27. The combination of an igniting-valve, 72 or 73, provided with a burner located in a recess, 76 or 77, and ports 86 or 87, communicating with the air through openings 88 or 89 in the face of the induction-valve when said burner is relighted, an aperture, 90 or 91, through the valve-cover, and a chimney and stationary burner, substantially as described.

28. A burner provided with a hollow stud, through which the burning-fluid is supplied, and disks with flanges having small openings located thereon, said stud being perforated between said disks, and said perforations being less in area than the openings in the flanges, in combination with an igniting-valve having a recess, in which said burner is located, and a recess or recesses extending therefrom, substantially as described.

29. A burner provided with a hollow stud, through which the burning-fluid is supplied, and disks with flanges having small openings located thereon, said stud being perforated between said disks, and said perforations being less in area than the openings in said flanges, and a valve for controlling the flow of said fluid through said stud, in combination with an igniting-valve having a recess, in which said burner is located, and a recess or recesses extending therefrom, substantially as described.

30. The combination, with the cylinder of a gas-engine, of a cleaning-pipe and valve controlling the same, constructed so that said valve will open by the force of the explosion of the mixture in the cylinder, and not by the compression of said mixture, to clean the cylinder, substantially as described.

31. The combination, with the cylinder of a gas-engine, of a pipe, 142, a differential valve, 134, and means for preventing the action of said valve, except when the cylinder is to be cleared out, substantially as described.

32. The combination, with the cylinder of a gas-engine, of a pipe, as 142, a differential valve, as 134, and a cock, as 133, substantially as described.

33. An oiling device consisting, essentially, of an oil-cup, a rod provided with a passage in the same, which passage, by the reciprocation of the rod, alternately opens and closes communication between the interior of the cylinder of a gas-engine and said oil-cup, combined with said cylinder, in which an explosive mixture is exploded under pressure, substantially as described.

34. An oiling device consisting of an oil-cup, a rod provided with a passage in the same regulated by a screw, which passage, by the reciprocation of the rod, alternately opens and closes communication between the interior of the cylinder of a gas-engine and said oil-cup, combined with said cylinder, in which an explosive mixture is exploded under pressure, substantially as described.

35. An oiling device consisting of an oil-cup, a rod provided with a passage in the same, which passage, by the reciprocation of the rod, alternately opens and closes communication between the interior of the cylinder of a gas-engine and said oil-cup, said oil-cup being also provided with a passage through which oil can be supplied to the devices outside of the said cylinder, which passage is alternately opened and closed by the said rod, combined with said cylinder, in which an explosive mixture is exploded under pressure, substantially as described.

36. The combination of a power-cylinder provided with a port, and a channel communicating therewith, with an igniting-valve provided with a burner supplied by a part of the explosive mixture in said power-cylinder through said port and channel, substantially as described.

37. The combination, with the cylinder of a gas-engine, of means, substantially as described, which will open by the force of the explosion of the gaseous mixture in the cylinder, and not by the compression of said mixture, to clean the cylinder.

In testimony whereof I have hereunto set my hand in the presence of two subscribing witnesses.

PETER MURRAY, JR.

Witnesses:
 T. H. PALMER,
 GEO. H. GRAHAM.